US012725986B2

(12) United States Patent
Dong

(10) Patent No.: US 12,725,986 B2
(45) Date of Patent: Sep. 1, 2026

(54) GROUNDING DEVICE AND ELECTRONIC EQUIPMENT

(71) Applicant: Beijing Zitiao Network Technology Co., Ltd., Beijing (CN)

(72) Inventor: Haoyuan Dong, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 378 days.

(21) Appl. No.: 18/520,446

(22) Filed: Nov. 27, 2023

(65) Prior Publication Data

US 2024/0178621 A1 May 30, 2024

(30) Foreign Application Priority Data

Nov. 28, 2022 (CN) ........................ 202211504508.6

(51) Int. Cl.

*H01R 13/6596* (2011.01)
*G02B 27/01* (2006.01)
*H01R 12/78* (2011.01)

(52) U.S. Cl.

CPC ..... *H01R 13/6596* (2013.01); *G02B 27/0176* (2013.01); *H01R 12/78* (2013.01)

(58) Field of Classification Search

CPC . H01R 13/6596; H01R 12/78; G02B 27/0176
USPC .................................................... 439/607.07
See application file for complete search history.

(56) References Cited

U.S. PATENT DOCUMENTS 4,658,375 A * 4/1987 Onogi .................. H05K 7/1478 439/492
5,383,787 A * 1/1995 Switky .................. H10W 78/00 439/71
5,571,021 A * 11/1996 Kawabe ................. H01R 12/79 439/70
6,144,559 A * 11/2000 Johnson ............... H05K 1/0246 361/825
6,520,789 B2 * 2/2003 Daugherty, Jr. ....... H01R 12/52 439/493
6,743,045 B1 * 6/2004 Hayashi ................. H01R 12/79 439/495

(Continued)

FOREIGN PATENT DOCUMENTS

CN 105744785 A 7/2016
CN 207427565 U 5/2018

*Primary Examiner* — Harshad C Patel
(74) *Attorney, Agent, or Firm* — BakerHostetler

(57) ABSTRACT

A grounding device and electronic equipment are provided, the grounding device includes a support member, a conductive member, and a grounding member, the support member has a grounding region; the conductive member includes a movable part, the movable part is configured to be connected with a movable component of an electronic equipment to enable at least a portion of the conductive member including the movable part to move back and forth relative to the supporting member under driving of the movable component; the grounding member includes a first grounding part and a second grounding part, the first grounding part is connected to the grounding region, and the second grounding part is against the conductive member to achieve an electrical connection between the grounding region and the conductive member through the grounding member.

16 Claims, 4 Drawing Sheets

(56) References Cited

U.S. PATENT DOCUMENTS 6,971,887 B1 * 12/2005 Trobough ............ H05K 7/1092 439/71
7,148,428 B2 * 12/2006 Meier ...................... H05K 1/14 361/785
7,168,961 B2 * 1/2007 Hsieh ................... H01R 12/725 439/74
7,425,135 B2 * 9/2008 Liu ........................ H01R 12/62 439/329
7,517,228 B2 * 4/2009 Baskaran ............. H05K 7/1092 439/71
8,432,705 B2 * 4/2013 Ge .......................... G06F 1/185 361/728
8,450,201 B2 * 5/2013 Braunisch ............ H05K 1/0243 438/599
8,485,831 B2 * 7/2013 Cipolla ................ H01R 13/514 439/74
8,867,231 B2 * 10/2014 Roitberg ............... H10W 72/00 361/792
9,113,551 B2 * 8/2015 McClatchie ............. H05K 1/14
9,478,885 B2 * 10/2016 MacDougall .......... H01R 12/73
9,590,338 B1 * 3/2017 Schmitt ................ H01R 12/714
9,887,496 B2 * 2/2018 Janssen .............. H01R 13/6592
10,283,885 B2 * 5/2019 Little ................... H01R 12/716
10,530,093 B2 * 1/2020 Schönfeld ............ H01R 9/0524
10,804,644 B2 * 10/2020 Cretella ............. H01R 13/5202
10,866,126 B2 * 12/2020 Iori ........................ H01R 31/06
10,892,573 B1 * 1/2021 Lu ........................ A61N 1/3752
10,903,594 B2 * 1/2021 Herring .............. H01R 13/6272
10,958,005 B1 * 3/2021 Dube .................. H01R 12/737
11,398,694 B2 * 7/2022 Henry .................. H01R 13/627
11,477,863 B2 * 10/2022 Yin ........................ H01B 7/361
11,509,126 B2 * 11/2022 Seyama ............... H02G 11/003
11,533,814 B2 * 12/2022 Kim ..................... H01R 12/526
11,673,481 B2 * 6/2023 Kusumi .................. B60L 53/16 439/527
11,721,932 B2 * 8/2023 Rahm .................... H02G 3/088 439/583
2008/0119070 A1 * 5/2008 Yang .................. H01R 13/6595 439/77
2008/0220650 A1 * 9/2008 Wu .................... H01R 13/6582 439/607.01
2008/0254652 A1 * 10/2008 Ma ..................... H01R 13/6583 439/67
2009/0023330 A1 * 1/2009 Stoner .................... H01R 12/62 439/493
2012/0178273 A1 * 7/2012 Cipolla .............. H01R 13/6587 439/65
2018/0035561 A1 * 2/2018 Lee .................... G02B 27/0176
2019/0116252 A1 * 4/2019 Hoellwarth .......... G02B 27/017

* cited by examiner

GROUNDING DEVICE AND ELECTRONIC EQUIPMENT

CROSS-REFERENCE TO RELATED APPLICATION

The present application claims priority to Chinese Patent Application No. 202211504508.6, filed on Nov. 28, 2022, the disclosure of which is incorporated herein by reference in its entirety.

TECHNICAL FIELD

Embodiments of the present disclosure relate to the field of electronic equipment grounding technology, and specifically relate to a grounding device and electronic equipment.

BACKGROUND

With the continuous development of technology, technologies such as Extended Reality (XR), Virtual Reality (VR), Augmented Reality (AR), and Mixed Reality (MR) have gradually entered various industries. Taking VR equipment as an example, users can use VR equipment, such as VR glasses, to watch virtual reality scenes.

In related technologies, there are some movable flexible conductive members in VR equipment. Taking flexible circuit boards as an example, when VR equipment are in complex electronic environment conditions, the flexible circuit boards are prone to generate high-voltage static electricity during movement, and the release of high-voltage static electricity can easily damage the electronic devices connected to them.

Therefore, in order to ensure the reliability of VR equipment's normal operation, it is usually necessary to design grounding schemes for flexible conductive members. However, the grounding schemes in related technologies are relatively complex.

SUMMARY

The embodiments of the present disclosure provide a grounding device and electronic equipment to solve the technical problem that the grounding schemes of the flexible conductive members in related technologies are relatively complex.

On the one hand, embodiments of the present disclosure provide a grounding device, which comprises a support member, a conductive member, and a grounding member, the support member has a grounding region; the conductive member comprises a movable part, the movable part is configured to be connected with a movable component of an electronic equipment to enable at least a portion of the conductive member comprising the movable part to move back and forth relative to the supporting member under driving of the movable component; the grounding member comprises a first grounding part and a second grounding part, the first grounding part is connected to the grounding region, and the second grounding part is against the conductive member to achieve an electrical connection between the grounding region and the conductive member through the grounding member.

On the other hand, embodiments of the present disclosure provide an electronic equipment, which comprises a movable component and the grounding device according to any one of the embodiments; the movable component is connected to the movable part of the conductive member in the grounding device, and the movable component is capable of moving back and forth relative to the support member of the grounding device to drive at least a portion of the conductive member comprising the movable part to move back and forth relative to the support member.

In the grounding device and the electronic equipment provided by embodiments of the present disclosure, by providing a support member, a conductive member and a grounding member, the support member has a grounding region, the conductive part includes a movable part, the movable part is configured to be connected with a movable component of the electronic equipment so that at least a portion of the conductive member including the movable part is able to move back and forth relative to the support member under the driving of the movable component. The grounding member includes a first grounding part and a second grounding part. The first grounding part is connected to the grounding region, and the second grounding part is against the conductive member to realize an electrical connection between the grounding region and the conductive member through the grounding member. When charges exist on the conductive member, the charges can be conducted to the grounding member through the second grounding part, and then conducted to the grounding region through the first grounding part for grounding, thereby achieving electrostatic discharge. In this scheme, a simple structure is adopted and the cost is low. At the same time, through the second grounding part being against the conductive member, the conductive member can still maintain good contact with the grounding member during the movement process, so that the conductive member can be reliably grounded.

BRIEF DESCRIPTION OF THE DRAWINGS

In order to clearly illustrate the embodiments of the present disclosure or the technical solutions in the prior art, a brief introduction will be given to the accompanying drawings required in descriptions of the embodiments or prior art. It is obvious that the accompanying drawings in the following descriptions are some embodiments of the present disclosure, for ordinary technical personnel in this field, other accompanying drawings can be obtained based on these drawings without creative labor. In the drawings.

Figure 1:
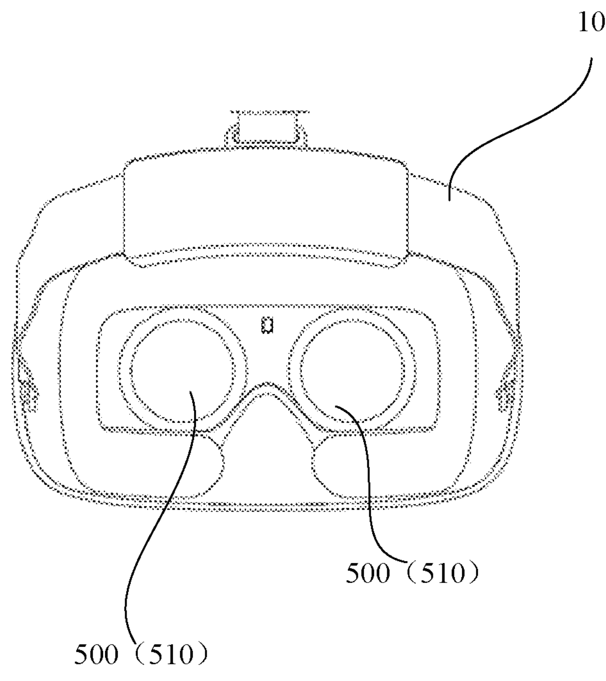
FIG. 1 is a structural schematic diagram of an electronic equipment provided by at least one embodiment of the present disclosure.

| Descriptions of reference numerals: | |
|---|---|
| 10: electronic equipment; | 100: support member; |
| 110: grounding region; | 200: conductive member; |

-continued

| Descriptions of reference numerals: | |
|---|---|
| 210: movable part; | 220: fixed part; |
| 230: flexible body; | 231: curved bending section; |
| 300: grounding member; | 310: first grounding part; |
| 320: second grounding part; | 330: flexible body; |
| 340: conductive layer; | 400: circuit board; |
| 500: movable component; | 510: lens assembly. |

DETAILED DESCRIPTION

The following is a detailed description of the embodiments of the present disclosure, and examples of the embodiments are shown in the accompanying drawings. The embodiments described below with reference to the accompanying drawings are exemplary and intended to explain the present disclosure, but cannot be understood as limiting of the present disclosure.

It should be understood that the various steps recorded in the method implementation of the present disclosure can be executed in different orders and/or in parallel. In addition, the method implementation may include additional steps and/or omit executing the shown steps. The scope of the present disclosure is not limited in this regard.

The term "comprise/include" and its variations used herein are open-ended, meaning "comprising/including but not limited to". The term "based on" refers to "at least partially based on". The term "one embodiment" means "at least one embodiment"; The term "another embodiment" means "at least one other embodiment"; The term "some embodiments" means "at least some embodiments". The relevant definitions of other terms will be given in the following descriptions.

It should be noted that the concepts such as "first" and "second" mentioned in the present disclosure are only used to distinguish different devices, modules or units, and are not intended to limit the order or interdependence of the functions performed by these devices, modules or units.

It should be noted that the modifications of "one" and "multiple" mentioned in the present disclosure are indicative rather than restrictive. Those skilled in the art should understand that unless otherwise explicitly stated in the context, they should be understood as "one or more".

The names of the messages or information exchanged between multiple devices in the embodiments of the present disclosure are for illustrative purposes only and are not intended to limit the scope of these messages or information.

The embodiments of the present disclosure can be applied to various application scenarios such as extended reality, virtual reality, augmented reality, and mixed reality.

First, some terms or phrases that appear during the description process of the embodiments of the present disclosure are explained as follows.

Extended reality refers to the concept including virtual reality, augmented reality, and hybrid reality, represents a technology that makes an environment that connects the virtual world and the real world, and with which the user is able to interact in real time.

Virtual reality refers to a technology for creating and experiencing a virtual world, which calculates and generates a virtual environment. It includes multi-source information (the virtual reality mentioned herein at least includes visual perception, and in addition may include auditory perception, tactile perception, motion perception, and even taste perception, olfactory perception, etc.), achieving fused and interactive simulation of 3D dynamic views and physical behavior of virtual environments, immersing the users themselves in simulated virtual reality environments to implement applications in various virtual environments such as maps, games, videos, education, healthcare, simulation, collaborative training, sales, collaborative manufacturing, maintenance, and repair.

Augmented reality refers to a technology that calculates camera pose parameters in the real world (also known as the 3D world or real world) in real time during the process of capturing images by the camera, and adds virtual elements to the images captured by the camera according to these camera pose parameters. Virtual elements include but are not limited to: images, videos, and 3D models. The goal of AR technology is to connect the virtual world onto the real world for interaction on the screen.

Hybrid reality refers to simulated sets that integrate sensory inputs (such as virtual objects) created by computers with sensory inputs or their representations from physical sets. In some MR sets, the sensory inputs created by computers can adapt to variations in sensory inputs from physical sets. In addition, some electronic systems used to present MR sets can monitor the orientation and/or position relative to the physical sets, enabling virtual objects to interact with real objects (i.e. physical elements or their representations from the physical sets). For example, the system can monitor motion, making virtual plants appear stationary relative to physical buildings.

The AV set in augmented reality refers to a simulated set in which a computer-created set or a virtual set is incorporated into at least one sensory input from a physical set. One or more sensory inputs from a physical set can be a representation of at least one feature of the physical set. For example, virtual objects can present the colors of physical elements captured by one or more imaging sensors. For another example, virtual objects can exhibit features that are consistent with actual weather conditions in the physical set, such as those identified through weather related imaging sensors and/or online weather data. In another example, augmented reality forests may have virtual trees and structures, but animals may have features accurately reproduced from images taken of physical animals.

Virtual field of view refers to the region in the virtual environment that users can perceive through a lens in a virtual reality device. The field of view (FOV) of the virtual field of view is used to represent the perceived region.

Virtual reality devices, terminals that achieve virtual reality effects, can usually be provided in the form of glasses, head mount display (HMD), or contact lenses for visual perception and other forms of perception. Of course, the forms implemented by virtual reality devices are not limited to these, and can be further miniaturized or enlarged as needed.

The virtual reality devices recorded in the embodiments of the present disclosure can include but are not limited to the following types.

Personal computer (PC) based virtual reality (PCVR) devices use the PC to perform related calculations and data output for virtual reality functions, while external PC based virtual reality devices use the data output from the PC to achieve virtual reality effects.

Mobile virtual reality devices support setting up mobile terminals (such as smartphones) in various ways (such as head-mounted displays with dedicated card slots). Through wired or wireless connections with the mobile terminal, the mobile terminal performs related calculations for virtual reality functions and outputs data to the mobile virtual reality device, such as watching virtual reality videos through the mobile terminal's APP.

All-in-one virtual reality devices are equipped with a processor for performing related calculations for virtual functions, thus have independent virtual reality input and output functions, do not need to be connected to a PC or a mobile terminal, and has a high degree of freedom of use.

Electro-static discharge (ESD) refers to the instantaneous current generated when two objects with stored charges come into contact with each other. Electro-static discharge may cause breakdown of components, which may cause hard or soft breakdown of the components. Hard breakdown refers to a one-time permanent failure of the component, such as an open circuit or short circuit between the output and input of the component. Soft breakdown can degrade the performance of the component and reduce its indicator parameters, resulting in potential faults.

Flexible printed circuit (FPC) is a highly reliable and excellent flexible printed circuit board made of polyimide or polyester film as the substrate.

With the gradual maturity of the VR equipment, because of the complex electronic environment conditions, in order to solve ESD problems, it is usually necessary to ground the electronic components in the VR equipment. Grounding requires stable connection between the electronic components and components such as the shell through conductive media. This is relatively easy to achieve for static electronic components, but it is difficult to achieve stable grounding for dynamic electronic components that are active. Therefore, the grounding of dynamic electronic components has always been a suffering point in the VR equipment.

In related technologies, taking the flexible circuit board as a dynamic electronic component as an example, in the VR equipment, there are usually two lens assemblies, each of which can be connected to a flexible circuit board. The other end of the flexible circuit board can be connected to the circuit board inside the VR equipment. In actual use, the position between the two lens assemblies can be adjusted according to the user's pupil distance, and during the adjustment process, the flexible circuit board will move back and forth following the lens assembly.

Due to the connection of the flexible circuit board to the lens assembly, some parts of the flexible circuit board are exposed to the outside of the VR equipment, i.e., the flexible circuit board is in a semi-naked state, and transient high-voltage static electricity is easily hit on the flexible circuit board and transmitted to the related devices through the lines on the flexible circuit board, causing device abnormalities and thus affecting the normal operation of the VR equipment.

In related technologies, a local exposed copper position is usually set on the circuit board connected to the flexible circuit board. The screw can pass through this exposed copper position and be screwed to the main board bracket made of magnesium alloy. When static electricity is released, the instantaneous high-voltage static electricity can be transmitted to the main board bracket through the flexible circuit board, the circuit board, and the screw, thereby releasing the instantaneous high-voltage static electricity through an indirect way. However, when static electricity is released, due to the charge passing through the circuit board, there is a risk of interference with the components on the circuit board. Therefore, in order to avoid static interference with the components on the circuit board, it is necessary to connect protective components in series on the circuit board, which not only increases cost but also increases the complexity of circuit board wiring.

In order to solve at least one of the above problems, the embodiments of the present disclosure provide a grounding device and electronic equipment. By setting a support member, a conductive member, and a grounding member, the support member has a grounding region, the conductive member includes a movable component, which is configured to be connected with the movable component of the electronic equipment, so that at least a portion of the conductive member including the movable component can move back and forth relative to the support member under the driving of the movable component. The grounding member includes a first grounding part and a second grounding part. The first grounding part is connected to the grounding region, and the second grounding part is against the conductive member to achieve an electrical connection between the grounding region and the conductive member through the grounding member. When there is an electric charge on the conductive member, the electric charge can be transmitted to the grounding member through the second grounding part, and then transmitted to the grounding region through the first grounding part for grounding, thereby achieving electro-static discharge. In this scheme, a simple structure is adopted and the cost is low. At the same time, through the second grounding part being against the conductive member, the conductive member can still maintain good contact with the grounding member during movement process, thereby enabling the conductive member to be reliably grounded.

The following is a detailed description of the technical solution of the present disclosure and how the technical solution of the present disclosure solves the above technical problems with specific embodiments. The following specific embodiments can be combined with each other, and the same or similar concepts or processes may not be repeated in some embodiments. In the following, the embodiments of the present disclosure are described in conjunction with the accompanying drawings.

Figure 2:
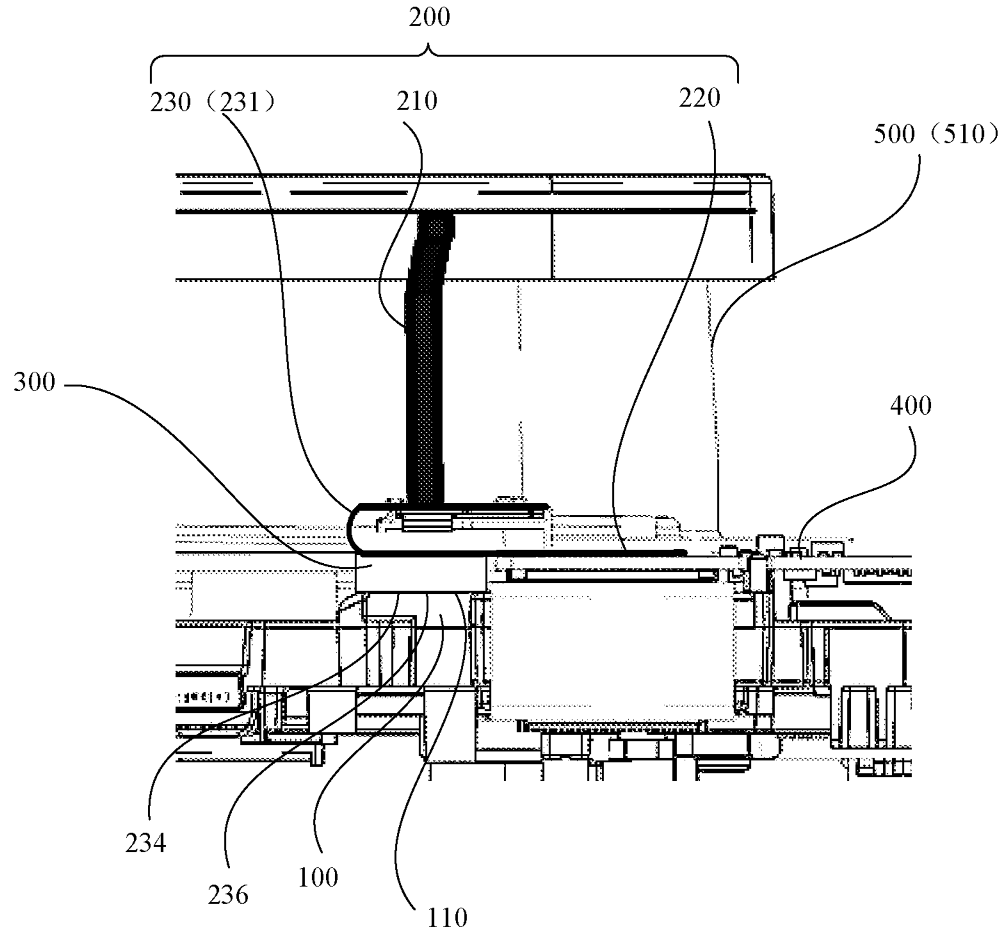
FIG. 2 is a structural schematic diagram of a grounding device provided by at least one embodiment of the present disclosure.

FIG. 1 is a structural schematic diagram of the electronic equipment provided by at least one embodiment of the present disclosure; FIG. 2 is a structural schematic diagram of the grounding device provided by at least one embodiment of the present disclosure; please refer to FIG. 1 and FIG. 2, the embodiments of the present disclosure provide a grounding device, the grounding device can be applied to various electronic equipment 10, especially XR equipment, VR equipment, AR equipment, MR equipment, etc.

For ease of explanation, the following will take the electronic equipment 10 being the head-mounted VR equipment as an example to illustrate. The electronic equipment 10 may have a movable component 500. For example, the movable component 500 may be the lens assembly 510 of the head-mounted VR equipment, and the two lens assemblies 510 can be close to or far away from each other, thereby changing the distance between the two lens assemblies 510 to adapt to different users. Of course, the electronic equipment 10 can also be any other electronic equipment with grounding requirements.

As shown in FIG. 2, the grounding device includes a support member 100, a conductive member 200, and a grounding member 300. The support member 100 has a grounding region 110; the conductive member 200 includes a movable part 210, which is configured to be connected with the movable component 500 of the electronic equipment 10, so that at least a portion of the conductive member 200 including the movable part 210 can move back and forth relative to the support member 100 under the driving of the movable component; the grounding member 300 includes a first grounding part 310 and a second grounding part 320.

The first grounding part 310 is connected to the grounding region 110, and the second grounding part 320 is against the conductive member 200 to achieve an electrical connection between the grounding region 110 and the conductive member 200 through the grounding member 300.

The support member 100 may be the main supporting or fixing component such as a main board bracket and an equipment shell. There are various shapes and sizes of the support member 100, which can be set according to the actual situation. In one embodiment, the support member 100 may be made of magnesium alloy, which can be a main board bracket.

The support member 100 may have a grounding region 110, the grounding region 110 may be a conductive and grounded region on the support member 100. In some embodiments, the support member 100 may be made of a conductive material, such as metal, an organic conductive material, etc., and the grounding region 110 is composed of a portion of the region on the support member 100. In other embodiments, the support member 100 may include a conductive part and a non-conductive part. The conductive part may be made of a conductive material, and the grounding region 110 may be area region within the conductive part.

It can be understood that if the support member 100 is the shell of the electronic equipment, the charges in the grounding region 110 can be electrically connected to the ground through conductive media such as the shell and the user. If the support member 100 is an internal component of the shell such as the main board bracket, the support member 100 may also achieve the electrical connection between the grounding region 110 and the ground by being connected to the shell.

The conductive member 200 may be an electronic component or metal component with grounding requirements in the electronic equipment. The conductive member 200 includes a movable part 210, which may be an end of the conductive member 200, or the movable part 210 may be an intermediate part between the ends of the conductive member 200.

The movable part 210 may be fixedly connected to the movable component 500 of the electronic equipment 10, and the movable component 500 may be a component in the electronic equipment 10 that can achieve back and forth motion, such as the lens assembly 510 of the head-mounted VR equipment. During the process of adjusting the position of the lens assembly 510, the movable part 210 can move back and forth following the lens assembly 510, thereby driving at least some conductive members 200 to move back and forth relative to the support member 100.

It can be understood that during the back and forth motion of the movable component 500, the support member 100 remains relatively stationary, i.e., the movable part 210 can move back and forth relative to the support member 100 following the movable component 500. In some embodiments, the entire conductive member 200 may move back and forth relative to the support member 100. In other embodiments, a portion of the conductive member 200 may move back and forth relative to the support member 100, while another portion of the conductive member 200 may remain relatively stationary relative to the support member 100.

In addition, the direction of back and forth motion can be in various dimensions of space, such as in the direction of a straight line or an arc line, which will not be specifically limited here.

The grounding member 300 may be made of a conductive material and can be used to achieve the electrical connection between the conductive member 200 and the support member 100. Specifically, the grounding member 300 includes a first grounding part 310 and a second grounding part 320.

The first grounding part 310 and the second grounding part 320 can be two ends of the grounding member 300, or can also be two surfaces of the grounding member 300, or the first grounding part 310 can be one surface of the grounding member 300, the second grounding part 320 can be one end of the grounding member, or the first grounding part 310 can be one end of the grounding member 300, and the second grounding part 320 can be one surface of the grounding member.

Figure 3:
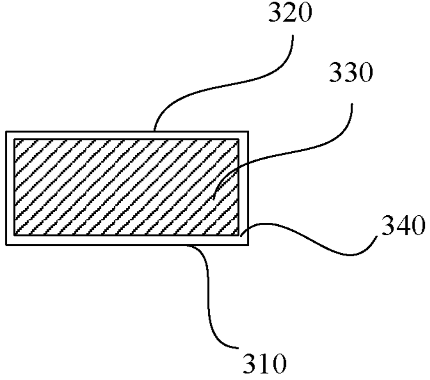
FIG. 3 is a cross-sectional view of the grounding component in FIG. 2.

FIG. 3 is a cross-sectional view of the grounding member in FIG. 2; please refer to FIG. 2 and FIG. 3, in some embodiments, the grounding member 300 may be a block like structure, with an upper surface forming the second grounding part 320. The lower surface of the grounding member 300 opposite to the upper surface can form the first grounding part 310.

The first grounding part 310 can be connected to the grounding region 110 of the support member 100. Specifically, the first grounding part 310 can be fixedly connected to the support member 100 through detachable means such as screw connection, clamp connection, etc. Alternatively, the first grounding part 310 can be fixedly connected to the support member 100 through non detachable means such as bonding, riveting, etc. Alternatively, the first grounding part 310 can also be against the grounding region 110 of the support member 100 by relying solely on external forces, without any additional connection between the two.

The second grounding part 320 is against the conductive member 200, that is, there is an interaction force between the second grounding part 320 and the conductive member 200. The second grounding part 320 can be pressed to be against the conductive member 200 under the action of force to achieve the electrical connection between the grounding region 110 and the conductive member 200 through the grounding member 300. It can be understood that during the back and forth motion of the movable part 210, there is always a pressure contact between the second grounding part 320 and the conductive member 200.

When there are electric charges on the conductive member 200, the instantaneous high-voltage static electricity can be transmitted to the grounding member 300 through the second grounding part 320, and then to the grounding region 110 through the first grounding part 310, thereby achieving electro-static discharge. Compared to the solutions in related technologies, the instantaneous high-voltage static electricity does not pass through the circuit board connected to the conductive member, thus avoiding interference with other components on the circuit board, and there is no need to connect protective components in series on the circuit board. Furthermore, it can reduce the complexity of circuit board wiring and the cost of grounding schemes.

At the same time, through the second grounding part 320 being against the conductive member 200, the conductive member 200 can still maintain good pressure contact with the grounding member 300 under the action of force during the back and forth motion process, so that the movable conductive member 200 can be reliably grounded.

In some embodiments, the conductive member 200 further includes a fixed part 220 fixedly connected to the support member 100 and a flexible body 230 located between the movable part 210 and the fixed part 220; the second grounding part 320 is against the flexible body 230, and the flexible body 230 can undergo repeated deformation under the driving force of the back and forth motion of the movable part 210.

The fixed part 220 may be arranged at one end of the conductive member 200. For example, the fixed part 220 may be one end of a flexible circuit board, and this end can be fixed to the circuit board 400 through a connector. The circuit board 400 can be relatively fixed with the support member 100, so that the fixed part 220 can maintain a fixed connection with the support member 100.

The fixed part 220 and the movable part 210 may be located at the two ends of the conductive member 200. It can be understood that these two ends may be provided opposite to each other in a certain direction, or the two ends may not be provided opposite to each other, and can be set according to the shape of the conductive member 200.

Alternatively, for the fixed part 220 and the movable part 210, one may be located at the end of the conductive member 200, and the other may be located at the middle position of the conductive member or the like.

The conductive member 200 further includes the flexible body 230 located between the movable part 210 and the fixed part 220. The flexible body 230 has flexibility and can deform under external forces. The second grounding part 320 can be against the flexible body 230. Because the fixed part 220 is fixed to the support member 100, when the movable part 210 move back and forth with the movable component 500, the flexible body 230 can continuously deform, such as bending deformation, with the movable part 210, so that the conductive member 200 can achieve the electrical signal transmission between the fixed component and the movable component 500 in the electronic equipment 10.

In some embodiments, the flexible body 230 has a curved bending section 231. The movable part 210 is connected to the first end of the curved bending section 231, the fixed part 220 is connected to the second end of the curved bending section 231, and in the direction perpendicular to the back and forth motion direction of the movable part 210, the size between the first end and the grounding region 110 is greater than the size between the second end and the grounding region 110; the flexible body 230 can provide pressure to the grounding member 300 under the bending deformation of the curved bending section 231, so that the second grounding part 320 is against one side of the flexible body 230 close to the grounding region 110.

In this embodiment, the movable part 210 can follow the movable component 500 to move in the left and right directions in FIG. 2, and during this movement process, the position of the curved bending section 231 can also change.

Continuing with reference to FIG. 2, the flexible body 230 can be roughly divided into a curved bending section 231 and a first section and a second section located at both ends of the curved bending section 231. The curved bending section 231 can be roughly in a "C" shape. The top end of the "C" shape may form the first end of the curved bending section 231, the bottom end of the "C" shape may form the second end of the curved bending section 231, and the first section and the second section may be roughly parallel. The first section is connected to the first end of the curved bending section 231. The second section is connected to the second end of the curved bending section 231. The first section may also be connected to the movable part 210, thus indirectly achieving the connection between the movable part 231 and the first end. The end of the second section that is away from the curved bending section 231 may be connected to the fixed part 220, thus indirectly achieving the connection between the fixed part 220 and the second end.

The vertical distance between the first end and the grounding region 110 is greater than the vertical distance between the second end and the grounding region 110, i.e., the first section can be located at the top of the second section away from the grounding region 110. Due to the presence of the curved bending section 231, the first section can provide pressure to the second section through the curved bending section 231, causing the second section to have a downward movement trend. This pressure can cause the second grounding part 320 of the grounding member 300 to rest against the flexible body 230.

By providing pressure through the flexible deformation of the flexible body 230, the grounding member 300 can be firmly against between the conductive member 200 and the grounding member 300, with a simple structure and easy implementation.

Figure 4:
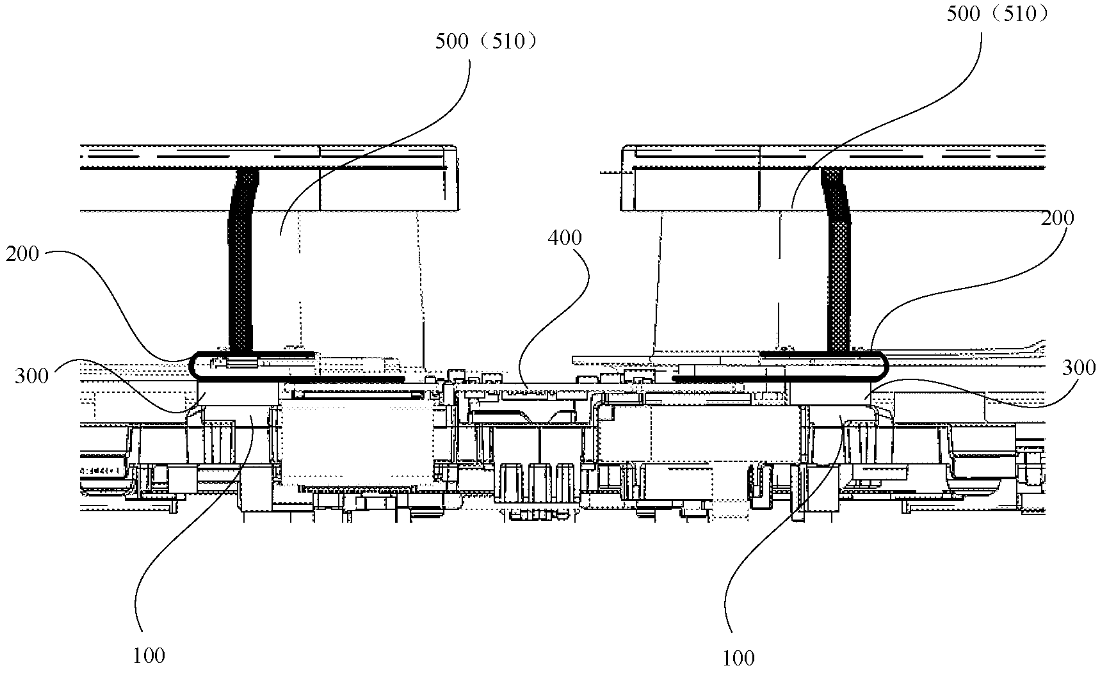
FIG. 4 is a structural schematic diagram of a grounding device provided by at least one embodiment of the present disclosure in a case that a movable component is moved to its maximum stroke.
Figure 5:
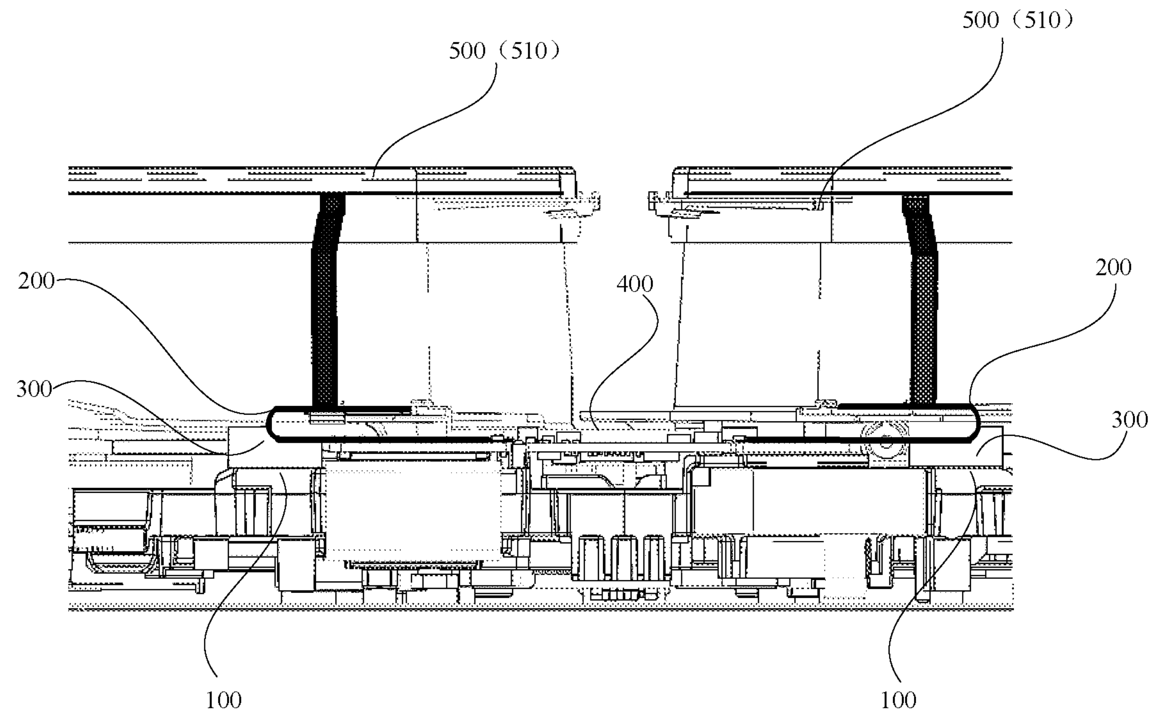
FIG. 5 is a structural schematic diagram of a grounding device provided by at least one embodiment of the present disclosure in a case that a movable component is moved to the minimum stroke.

FIG. 4 is a structural schematic diagram of the grounding device provided by at least one embodiment of the present disclosure when the movable component moves to the maximum stroke, i.e., the position where the distance between two lens assemblies 510 is the maximum; FIG. 5 is a structural schematic diagram of the grounding device provided by at least one embodiment of the present disclosure when the movable component moves to the minimum stroke, i.e., the position where the distance between two lens components 510 is the minimum.

Please refer to FIG. 2, FIG. 4, and FIG. 5, taking the conductive member 200 on the left side in FIG. 4 and FIG. 5 as an example, when the movable part 210 moves from the position in FIG. 4 to the position in FIG. 5, that is, from left to right, the curved bending section 231 also moves from left to right. In this case, the length of the first section increases, and the length of the second section decreases, that is, some of the second section transforms into the curved bending section 231, while some of the curved bending section 231 transforms into the first section. On the contrary, when the movable part moves from the position FIG. 5 to the position FIG. 4, that is, from right to left, the curved bending section 231 also moves from right to left. In this case, the length of the first section decreases, and the length of the second section increases, that is, some of the first section transforms into the curved bending section 231, while some of the curved bending section 231 transforms into the second section.

It can be understood that the first section and the second section are shown in this embodiment. In some embodiments, when the movable component 500 moves to the maximum stroke, the first section can all be converted into the curved bending section 321. In this case, the first section disappears, and the movable part 210 can be directly connected to the curved bending section 231. In some embodiments, when the movable component 500 moves to the minimum stroke, the second section can all be converted into the curved bending section 321. In this case, the second section disappears, and the fixed part 220 can be directly connected to the curved bending section 231, which can be set specifically according to the actual situation.

In some embodiments, continuing to refer to FIG. 4 and FIG. 5, during the process of repeated deformation of the flexible body 230, the contact area between the second grounding part 320 and the flexible body 230 changes within a preset range.

When the movable component 500 moves to the maximum stroke, the flexible body 230 can come into contact with all the upper surface of the grounding member 300, and when the movable component moves to the minimum stroke, the flexible body 230 can come into contact with some of the upper surface of the grounding member 300, thereby causing the contact area between the flexible body 230 and the second grounding part 320 to vary within the contact area range of FIG. 4 and FIG. 5, which can form a preset range.

In other embodiments, during the process of repeated deformation of the flexible body 230, the contact area between the second grounding part 320 and the flexible body 230 remains unchanged.

When the movable component 500 moves to the maximum stroke, the flexible body 230 can contact with all the upper surface of the grounding member 300, and when the movable component moves to the minimum stroke, the flexible body 230 can also contact with all the upper surface of the grounding member 300, thereby maintain the contact area between the flexible body 230 and the second grounding part 320 unchanged. That is, during the movement of the movable part 210, the flexible body 230 can always maintain contact with all the upper surface of the grounding member 300.

Both of the above two contact methods can directly transmit the instantaneous high-voltage static electricity on the conductive member 200 to the grounding region 110 of the support member 100 through the grounding member 300.

In some embodiments, the flexible body 230 is coated with an insulation layer, and a first opening is provided on the insulation layer. The second grounding part 320 is against the flexible body 230 exposed by the first opening.

It can be understood that the outer surface of flexible body 230 can be covered with an insulation layer, which can be set on the outer surface of flexible body 230 through various means such as printing or film coating. The insulation layer can be made of an insulating material that cannot conduct electricity, such as rubber, plastic, etc. The insulation layer can protect the signal transmission of the flexible body 230 from external interference.

In order to achieve the electrical connection between the flexible body 230 and the grounding member 300, a portion of the insulation layer between the flexible body 230 and the second grounding part 320 can be provided with the first opening, which can be achieved through the exposed copper treatment, such as etching, polishing, etc. Alternatively, the first opening can be achieved by covering the region where the first opening is located through methods such as masking during the processing of the insulation layer. The first opening can expose the flexible body 230, so that the second grounding part 320 can directly contact the flexible body 230.

In some embodiments, for example, in the embodiment shown in FIG. 4, when the movable component 500 moves to its maximum stroke, the flexible body 230 exposed by the first opening can all contact with the grounding member 300.

In the embodiment shown in FIG. 5, when the movable component 500 moves to the minimum stroke, due to the reduced contact area between the flexible body 230 and the grounding member 300, the portion of the flexible body 230 exposed by the first opening can contact with the grounding member 300, while the other portion cannot contact with the grounding member 300.

Of course, in other embodiments, during the movement process of the movable component 500, the contact area between the flexible body 230 exposed by the first opening and the grounding member 300 can also remain unchanged.

In some embodiments, the conductive member 200 may include a flexible circuit board. The flexible circuit board can be bent under external forces, which can enable the grounding member 300 to rely on the pressure provided by the flexible bending of the flexible circuit board to be against the flexible circuit board. The flexible circuit board can also achieve the transmission of electrical signals in the electronic equipment 10.

In some embodiments, continuing to refer to FIG. 2, the grounding device may further include a circuit board 400 electrically connected to the flexible circuit board. The flexible circuit board is fixedly connected to the circuit board 400 through a connector, and the circuit board is fixedly connected to the support member 100.

The connector can be a common component in related technologies that can achieve the connection between the flexible circuit board and the circuit board 400.

One end of the flexible circuit board can be connected to the lens assembly 510, and the other end of the flexible circuit board can be connected to the circuit board 400. Through the flexible circuit board, the transmission of electrical signals between the lens assembly 510 and the circuit board 400 can be achieved.

The circuit board 400 can be fixed to the support member 100 by screws. For example, there may be an exposed copper region on the circuit board 400. The region can be provided with through holes, the screws can be fixed to the support member 100 through the through holes, thereby achieving the fixation and grounding of the circuit board 400, further reducing the impact of electro-static discharge on the circuit board 400.

Moreover, by setting the grounding member 300 for the flexible circuit board, during the back and forth motion process of the movable part 210, instantaneous high-voltage static electricity on the flexible circuit board can be transmitted to the grounding region 110 of the support member 100 through the grounding component 300, thereby achieving grounding of the flexible circuit board and reducing the impact of instantaneous high-voltage static electricity on the electronic components on the circuit board 400 connected to the flexible circuit board.

At the same time, because the charge is directly grounded through the grounding member 300, it does not pass through the circuit board 400, and there is no need to provide protective components for the circuit board 400, which can reduce the complexity of the wiring of the circuit board 400 and the cost of grounding schemes.

On the basis of the above embodiments, as one possible implementation of the grounding member, the grounding member 300 is an elastic grounding member that can deform and generate elastic force under external forces, and the grounding member 300 relies on elastic forces to be against the conductive member.

It can be understood that the grounding member 300 has elasticity. For example, the grounding member 300 may be made of conductive silicone. Under the pressure of the flexible body 230, the grounding member 300 can undergo elastic deformation based on this pressure. As shown in FIG. 4, the entire upper surface of the grounding member 300 is in contact with the flexible body 230, and the entire grounding member 300 is in a compressed state under pressure in this case. As shown in FIG. 5, in this state, a portion of the upper surface of the grounding member is compressed due to contact with the flexible body 230, while the remaining portion of the upper surface is not in contact with the flexible body 230, resulting in less pressure on the grounding member 300 of that portion, and the elastic deformation is less or even disappears.

In addition, when not subjected to external forces, the height of the grounding member 300 along the upward and downward direction of FIG. 2 may be greater than the distance between the flexible body 230 and the grounding region 110 when the grounding member 300 is not provided (this distance may be greater than or equal to 0, that is, the conductive member 200 and the support member 100 may be set in suspension or almost in contact), so that when the grounding member 300 is installed between the conductive member 200 and the support member 100, the grounding member 300 can always be in a compressed state, thereby generating an elastic force, which can further increase the interaction force between the conductive member 200 and the grounding member 300, ensuring the connection reliability of the grounding member 300.

In some embodiments, continuing to refer to FIG. 3, the grounding member 300 may include an elastic body 330 and a conductive layer 340 on the surface of the elastic body 330. The first grounding part 310 and the second grounding part 320 are two opposite surfaces of the conductive layer 340.

The elastic body 330 may be a porous and compressible block like structure, such as sponge, foam, etc. The conductive layer 340 may be a conductive adhesive tape or a metal conductive plating layer, which can be set on the surface of the elastic body 330 through common connection methods such as bonding, plating, etc. In addition, by selecting a grounding member 300 with appropriate elastic modulus and a flexible body 230 with deformation capacity, the flexible body 230 can also undergo repeated deformation along with the movable part 210 when the flexible body 230 is against the grounding member 300, and the back and forth motion of the movable part 210 will not be affected.

The elastic body 330 can make the grounding member 300 elastic, that is, compressible, and the conductive layer 340 can make the grounding member 300 conductive, thereby achieving grounding. Moreover, the structure of the grounding member 300 is simple and easy to achieve.

The first grounding part 310 and the second grounding part 320 may be opposite surfaces of the conductive layer 340. For example, in FIG. 3, the upper surface of the conductive layer 340 can form the second grounding part 320, and the lower surface of the conductive layer 340 can form the first grounding part 310.

In some embodiments, the grounding member 300 may include conductive foam, which may be aluminum foil cloth foam, conductive fiber cloth foam, etc., which can be easily fixed to the support member 100.

In other embodiments, the grounding member 300 may be a rigid grounding member capable of resisting deformation.

Compared to the elastic grounding member, the rigid grounding member undergo almost no macroscopic deformation or insignificant deformation when subjected to external forces.

The rigid grounding member can also achieve a conductive function between the conductive member 200 and the grounding region 110. When the grounding member 300 is a rigid grounding member, the height of the rigid grounding member can be adjusted according to the actual situation, so that it can rest against the flexible body 230 of the conductive member 200.

On the basis of the above embodiments, the first grounding part 310 may also be fixedly connected to the grounding region 110. That is, the first grounding part 310 can be fixed to the grounding region 110 through common fixing methods, such as screw connection, clamp connection, riveting, welding, etc.

It can be understood that because the first grounding part 310 is connected to the support member 100 which is the component that can be relatively fixed in the electronic equipment 10, the connection reliability of the grounding part 300 can be further improved by fixing the first grounding part 310 to the grounding region 110.

In some embodiments, a conductive adhesive layer is provided between the first grounding part 310 and the grounding region 110. The conductive adhesive layer may be a conductive adhesive or the like which can be a liquid or gel-like structure that can be changed to a solid shape after curing, or the conductive adhesive layer may also be structures such as conductive adhesive tape or the like.

The conductive adhesive layer can achieve a fixed connection between the first grounding part 310 and the grounding region 110, and at the same time, the conductive adhesive layer can also achieve an electrical connection between the first grounding part 310 and the grounding region 110.

As a possible implementation of the support member 100, the support member 100 may include a support body made of a metal material and an oxide layer coated on the surface of the support body. The oxide layer has a second opening, and the grounding region 110 is the surface region of the support body exposed by the second opening.

It can be understood that the support body may be made of magnesium alloy or other materials with high structural strength and light weight, which is conducive to improving the portability of the electronic equipment 10. Magnesium alloys and the like can form an oxide layer on the surface in the air, which can protect the support member 100 from corrosion, etc.

If an oxide layer is formed on the surface of the support body, a second opening can be formed in the oxide layer through laser engraving treatment, etc. Laser engraving treatment is a surface treatment process that can use lasers or the like to remove some of the oxide layer to form the second opening. Of course, the second opening can also be achieved through processes such as etching and polishing.

The surface of the support body exposed by the second opening can be the grounding region 110, which can be used to be connected with the first grounding part 310, thereby achieving the electrical connection between the grounding member 300 and the support member 100.

Continuing with reference to FIG. 1, the embodiments further provide an electronic equipment 10, including a movable component 500 and a grounding device; the movable component 500 is connected to the movable part 210 of the conductive member 200 in the grounding device, and the movable component 500 can move back and forth relative to the support member 100 of the grounding device to drive at least a portion of the conductive member 200 including the movable part 210 to move back and forth relative to the support member 100.

The structure and function of the grounding device are the same as the above embodiments, and specific details can be referred to the above embodiments, which will not be repeated here.

There are various types of the electronic equipment 10, such as computers, mobile phones, and other electrical equipment. In particular, the electronic equipment 10 may be XR equipment, VR equipment, AR equipment, MR equipment, etc. It can usually be provided in the form of glasses, helmet mounted displays, contact lenses for visual perception and other forms of perception. Of course, the implementation form of the electronic equipment is not limited to these, and can be further miniaturized or enlarged as needed.

The movable component 500 may be a component with back and forth motion function in the electronic equipment 10, and the movable part 210 of the conductive member 200 can be fixedly connected to the movable component 500.

For the electronic equipment 10 provided by the embodiments, when there are charges on the conductive member 200, the charges can be transmitted to the grounding member 300 through the second grounding part 320, and then to the grounding region 110 through the first grounding part 310 for grounding, thereby achieving electro-static discharge. In this scheme, a simple structure is adopted and the cost is low. At the same time, through the second grounding part 320 being against the conductive member 200, the conductive member 200 can still maintain good contact with the grounding member 300 during movement process, enabling the conductive member 200 to be reliably grounded.

In some embodiments, the electronic equipment 10 includes head-mounted virtual reality equipment, the movable component 500 includes a lens assembly 510, and the movable part 210 is connected to the lens assembly 510. The lens assembly 510 may include a lens barrel and lenses installed on the lens barrel. In FIG. 2, the movable part 210 may be a part of wiring lines in the conductive member 200. This movable part 210 can be affixed and secured to the outer wall of the lens barrel in the lens assembly 510 and extend from below to above along the lens barrel, and connected to the electronic components in the lens assembly 510.

The conductive member 200 can follow the movement of the lens assembly 510 and provide electrical signals required by the lens assembly 510. The grounding device can reduce the impact of electro-static discharge on the electronic equipment 10, enabling the lens assembly 510 to work normally and improving the reliability of the electronic equipment 10.

In addition, as shown in FIG. 4 and FIG. 5, the electronic equipment 10 may include two lens assemblies 510, each lens assembly 510 may be connected to the circuit board 400 through a flexible circuit board. A grounding member 300 may be connected between each flexible circuit board and the support member 100, respectively, so as to conduct static electricity on the two flexible circuit boards to the two grounding regions 110 of the support member 100 respectively.

Figure 6:
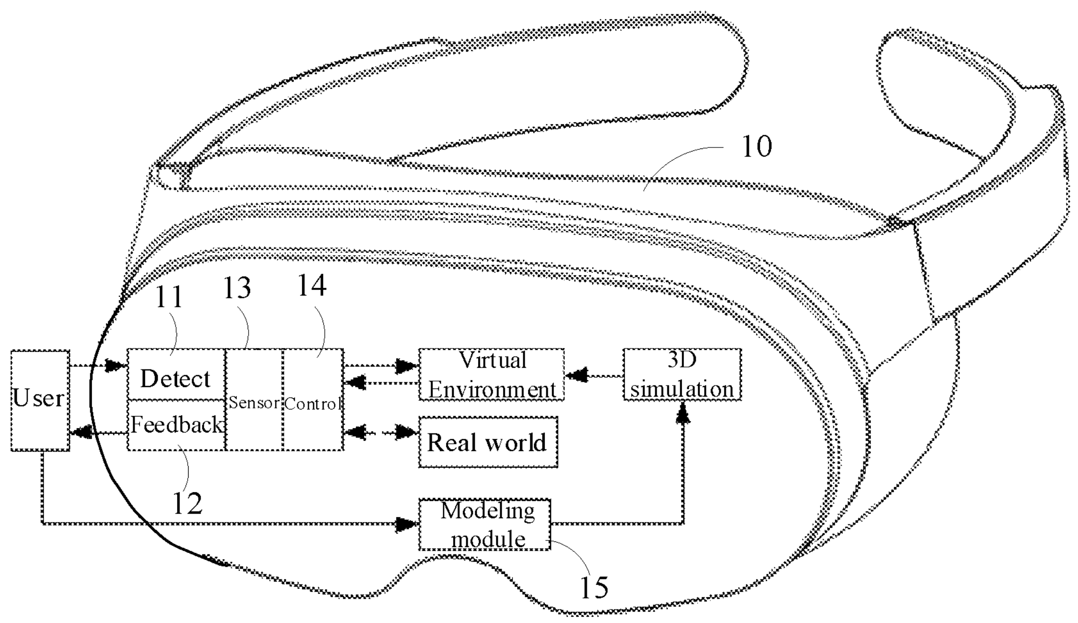
FIG. 6 is a structural schematic diagram of an electronic equipment provided by at least one embodiment of the present disclosure.

It can be understood that in this embodiment, the two lens assemblies 510 can share one circuit board 400 and one support member 100, and the two flexible circuit boards can share one grounding region 110. Of course, in other embodiments, two lens assemblies 510 can be connected to two circuit boards respectively through flexible circuit boards, or two lens assemblies 510 can be connected to two support members respectively, or, two flexible circuit boards can be connected to one grounding region 110. FIG. 6 is a structural schematic diagram of an electronic equipment provided by at least one embodiment of the present disclosure. As shown in FIG. 6, the electronic equipment 10 may include but is not limited to the following compositions: a detection module 11, a feedback module 12, a sensor 13, a control module 14, and a modeling module 15.

The detection module 11 uses various sensors to detect user operation commands, or uses a camera to capture real images and act on the virtual environment, such as continuously updating the images displayed on the display screen following the user's line of sight, achieving user interaction with the virtual scene, such as continuously updating real contents based on the detected rotation direction of the user's head.

The feedback module 12 receives data from the sensors and provides real-time feedback to users; the feedback module 12 may be used to display a graphical user interface, such as displaying a virtual environment on the graphical user interface. For example, the feedback module 12 may include the lens assembly 510, etc.

The sensor 13, on the one hand, receives operation commands from the user and applies them on the virtual environment; on the other hand, provides the results generated after the operation to users in various forms of feedback.

The control module 14 controls the sensors and various input/output devices, including obtaining user data (such as actions, speech) and outputting perceptual data, such as images, vibrations, temperature, and sound, to act on the user, the virtual environment, and the real world.

The modeling module 15 constructs a 3D model of the virtual environment, which may also include various feedback mechanisms such as sound and touch in the 3D model.

It can be understood that the conductive member of any one of the above modules can be grounded through the grounding device of any one of the above embodiments. For details, please refer to the above embodiments without further elaboration.

In the descriptions of this specification, the descriptions of the reference terms "one embodiment", "some embodiments", "examples", "specific examples", or "some examples" refer to the specific features, structures, materials, or characteristics described in conjunction with the embodiment or example being comprised in at least one embodiment or example of the present disclosure. In this specification, the schematic expressions of the above terms do not necessarily refer to the same embodiment or example. Moreover, the described specific features, structures, materials, or characteristics can be combined in an appropriate manner in any one or more embodiments or examples.

In the description of the present disclosure, it should be understood that the orientation or positional relationship indicated by the terms "center", "longitudinal", "transversal", "length", "width", "thickness", "above", "below", "front", "back", "left", "right", "vertical/perpendicular", "horizontal", "top", "bottom", "inside", "outside", "clockwise", "counterclockwise", "axial", "radial" "circumferential" is the orientation or positional relationship shown based on the attached drawings, and is only for facilitating the description of the present disclosure and simplifying the description, rather than indicating or implying that the device or component referred to must have a specific orientation and be constructed and operated in a specific orientation, and therefore the terms cannot be understood as a limitation on the present disclosure.

In addition, the terms "first", "second" and other terms used in the embodiments of the present disclosure are only for descriptive purposes and cannot be understood as indicating or implying relative importance, or implying the number of technical features indicated in the embodiments. Therefore, the features defined by the terms "first", "second" and so on in the embodiments of the present disclosure can clearly or implicitly indicate that the embodiment includes at least one of these features. In the description of the present disclosure, the term "multiple" means at least two or more, such as two, three, four, etc., unless otherwise expressly and specifically limited in the embodiments.

In the present disclosure, unless there are clear relevant provisions or limitations in the embodiments, the terms "installation", "connecting", "connection", and "fixation" appearing in the embodiments should be broadly understood. For example, the connection may be a fixed connection, or a detachable connection, or an integral part, which can be understood as mechanical connection, electrical connection, etc. Of course, the connection may also be direct connection, indirect connection through intermediate media, or the internal connection between two components, or the interaction relationship between two components. For those of ordinary skill in the art, they can understand the specific meanings of the above terms in the present disclosure according to the specific implementation situation.

In the present disclosure, unless otherwise specified and limited, the first feature being "above" or "below" the second feature may be a direct contact between the first feature and the second feature, or the first feature and the second feature are in indirect contact through intermediate media. Moreover, the first feature being "on", "above", and "over" the second feature may be the first feature being directly or diagonally above the second feature, or simply indicates that the horizontal height of the first feature is higher than the horizontal height of the second feature. The first feature being "under", "below", and "beneath" the second feature may be the first feature being directly or diagonally below the second feature, or simply indicates that the horizontal height of the first feature is less than the horizontal height of the second feature.

It should be noted that the various technical features of the above embodiments can be combined arbitrarily. To make the description concise, all possible combinations of various technical features in the above embodiments have not been described. However, as long as there is no contradiction in the combinations of these technical features, they should be considered within the scope of the specification.

The embodiments above are only specific implementations in the present disclosure, but the protection scope of the present disclosure is not limited to these. Any technical personnel familiar with the technical field can easily think of changes or replacements within the scope disclosed in the present disclosure, which should be covered in the protection scope of the present disclosure. Therefore, the protection scope of the present disclosure should be based on the protection scope of the claims.

What is claimed is:

1. A grounding device, comprising:

a support member, having a grounding region;

a conductive member, comprising a movable part, wherein the movable part is configured to be connected with a movable component of an electronic equipment to enable at least a portion of the conductive member comprising the movable part to move back and forth relative to the supporting member under driving of the movable component; and a grounding member, comprising a first grounding part and a second grounding part, wherein the first grounding part is connected to the grounding region, and the second grounding part is in physical contact with the conductive member to achieve an electrical connection between the grounding region and the conductive member through the grounding member to facilitate an electrical discharge of electrical buildup at the conductive member.

2. The grounding device according to claim 1, wherein the conductive member further comprises a fixed part fixedly connected to the support member and a flexible body located between the movable part and the fixed part; the second grounding part is in physical contact with the flexible body, and the flexible body is capable of undergoing repeated deformation under driving of the back and forth motion of the movable part.

3. The grounding device according to claim 2, wherein the flexible body has a curved bending section, the movable part is connected to a first end of the curved bending section, the fixed part is connected to a second end of the curved bending section, and the first end is located a greater distance away from the grounding region than the second end;

the flexible body is capable of providing pressure to the grounding member under bending deformation of the curved bending section, so that the second grounding part is in physical contact with a side of the flexible body close to the grounding region.

4. The grounding device according to claim 2, wherein, during a process of repeated deformation of the flexible body, a contact area between the second grounding part and the flexible body remains unchanged;

or, during a process of repeated deformation of the flexible body, a contact area between the second grounding part and the flexible body changes within a predetermined range.

5. The grounding device according to claim 2, wherein the flexible body is coated with an insulation layer, and a first opening is provided on the insulation layer, and the second grounding part is in physical contact with the flexible body exposed by the first opening.

6. The grounding device according to claim 1, wherein the grounding member is an elastic grounding member that is capable of undergoing deformation and generating elastic force under an external force, and the grounding part relies on the elastic force to be against the conductive member.

7. The grounding device according to claim 6, wherein the grounding member comprises an elastic body and a conductive layer arranged on a surface of the elastic body, and the first grounding part and the second grounding part are two surfaces of the conductive layer that are arranged opposite.

8. The grounding device according to claim 1, wherein the grounding member is a rigid grounding member capable of resisting deformation.

9. The grounding device according to claim 1, wherein the first grounding part is fixedly connected to the grounding region.

10. The grounding device according to claim 9, wherein a conductive adhesive layer is arranged between the first grounding part and the grounding region.

11. The grounding device according to claim 1, wherein the support member comprises a support body formed of a metal material and an oxide layer coated on a surface of the support body, the oxide layer has a second opening, and the grounding region is a surface region of the support body exposed by the second opening.

12. The grounding device according to claim 1, wherein the conductive member comprises a flexible circuit board.

13. The grounding device according to claim 12, further comprising a circuit board electrically connected to the flexible circuit board, wherein the flexible circuit board is fixedly connected to the circuit board, and the circuit board is fixedly connected to the support member.

14. The grounding device according to claim 1, wherein the grounding member comprises a conductive foam.

15. An electronic equipment, comprising: the movable component and the grounding device according to claim 1;

wherein the movable component is connected to the movable part of the conductive member in the grounding device, and the movable component is capable of moving back and forth relative to the support member of the grounding device to drive at least a portion of the conductive member comprising the movable part to move back and forth relative to the support member.

16. The electronic equipment according to claim 15, wherein the electronic equipment comprises a head-mounted virtual reality equipment, the movable component comprises a lens assembly, and the movable part is connected to the lens assembly.

* * * * *